United States Patent [19]
Rutledge

[11] Patent Number: 5,864,625
[45] Date of Patent: Jan. 26, 1999

[54] METHODS AND APPARATUS FOR SECURE OPTICAL COMMUNICATIONS LINKS

[75] Inventor: Christopher L. Rutledge, Somerset, N.J.

[73] Assignee: AT&T Corp, Middletown, N.J.

[21] Appl. No.: 819,465

[22] Filed: Mar. 17, 1997

[51] Int. Cl.$^6$ .................................................. H04K 1/00
[52] U.S. Cl. ............................................ 380/31; 380/21
[58] Field of Search ................................... 380/31, 21, 9

[56] References Cited

U.S. PATENT DOCUMENTS

| | | | |
|---|---|---|---|
| 4,901,367 | 2/1990 | Nicholson | 455/5 |
| 5,737,420 | 4/1998 | Tomko et al. | 380/23 |
| 5,793,871 | 8/1998 | Jackson | 380/54 |

*Primary Examiner*—David Cain

[57] ABSTRACT

Methods and apparatus for providing a secure optical communications link are disclosed. Communications information is encrypted with a security key. An optical beam is then modulated with both the security key and the encrypted communications information, with different modulation schemes being used for each. The dual-modulated optical beam is then transmitted to a receiver. At the receiver, the optical beam is split into first and second optical beams. First and second demodulators are then employed to demodulate the optical beams to recover the encrypted communications information and its data rate, and the security key and its data rate. The encrypted communications information, the security key, and the data rate information are then sent to decryption and timing circuitry which decrypts the encrypted communications information to obtain the original unencrypted communications information.

39 Claims, 1 Drawing Sheet

METHODS AND APPARATUS FOR SECURE OPTICAL COMMUNICATIONS LINKS

BACKGROUND OF THE INVENTION

This invention relates to optical communications, and more particularly to secure free-space optical telecommunications links.

Free-space optical telecommunications offers an attractive alternative to hard-wired or radio communication in certain situations. For example, a telecommunications services provider who wants to enter a new geographical area may have little or no hard-wired plant in that area and may wish to avoid the cost and complexity of installing such plant to serve the new area. Similarly, radio communications resources are limited and regulated, and a new telecommunications services provider may not have sufficient rights to use those resources in a new geographical area.

Free-space optical telecommunications is therefore attractive because it avoids the need for hard-wired plant and because, unlike radio telecommunication, it is essentially unregulated. Optical telecommunication also has the advantage of very large information capacity. Thus optical telecommunications links can support a wide range of telecommunications services such as telephone, video, audio, and computer data transmission.

A possible problem with free-space optical telecommunications is that it is subject to compromise (i.e., theft through optical beam interception), especially if a spatially broad optical beam is being used. For example, an eavesdropper may compromise a line-of-sight free-space optical telecommunications link by intercepting a portion of the optical power being transmitted through the link (e.g., by using an inexpensive photodetector). If the amount of optical power intercepted is small, the optical telecommunications link will function normally despite the interception (e.g., there will be no indication that the link has been compromised).

While it may be difficult to prevent (or even detect) the interception of an optical beam used in a free-space optical telecommunications link, the information traveling via the telecommunications link may nonetheless be protected from compromise by employing encryption techniques. "Encryption" refers to the transformation of information (e.g., "plaintext" or any unencrypted information) into an incomprehensible, "encrypted" form (e.g., "cipher") by means a security key. Encrypted information can be "decrypted" (i.e., transformed back into comprehensible information) if the security key used to encrypt the information is known. Using encryption techniques, information traveling via a free-space optical link may be secured (i.e., may be made uncompromiseable) even if the optical beam transporting the information is intercepted.

Information is normally encrypted while in an electronic form by any variety of techniques well known in the art. The encrypted information is then converted into an optical form by modulating an optical beam with the encrypted information. The optical beam is then transmitted to a receiver. In order for the receiver to decrypt the encrypted information carried by the optical beam, however, the receiver must know the security key used during the encryption process. One method for ensuring that the receiver has the required security key for decryption is to send the security key with the encrypted information signal. This may be performed electronically by combining the electronic encrypted information with an electronic security key to form a hybrid electronic signal which is then used to modulate the optical beam. However, such a system requires additional electronic circuitry at both the transmitter and receiver for combining and separating the encrypted communications information and the security key, and fails to take advantage of the ease and simplicity by which optical beams may be modulated/demodulated and the coherent nature of the light sources typically used in optical communications links (e.g., lasers).

In view of the foregoing, it is an object of this invention to improve optical telecommunications links.

It is a more particular object of this invention to reduce the complexity of secure free-space optical telecommunications links by providing a simplified method for transmitting both encrypted communications information and a security key with the same optical beam.

It is yet another object of this invention to utilize the phase coherence possessed by optical telecommunications light sources in order to simplify the transmission of encrypted communications information and a security key across an optical telecommunications link.

SUMMARY OF THE INVENTION

These and other objects of the invention are accomplished in accordance with the principles of the invention by providing a secure optical communications link in which an optical beam (e.g., a laser beam) is modulated by both a security key and encrypted communications information.

Communications information is encrypted while in electronic form by using a security key. Both the security key and the encrypted communications information are then used to modulate an optical beam during a first and a second modulation step. Preferably, a different modulation scheme is used for each modulation step (e.g., differential phase shift keying is used for the security key modulation step and on/off keying is used for the encrypted communications information modulation step). The dual-modulated beam is then transmitted through free space, an optical fiber, or any similar medium to a receiver.

At the receiver, the optical beam is received and split into a first and a second optical beam. First and second demodulators are then employed to demodulate the optical beams (the first demodulator demodulating the first optical beam to obtain the encrypted communications information and its data rate, and the second demodulator demodulating the second optical beam to obtain the security key and its data rate). Once the security key has been acquired, the encrypted communications information may be decrypted (to retrieve the original communications information). In a preferred embodiment wherein the encrypted communications information modulates the optical beam using on/off keying, the encrypted communications information is given a higher data rate than the security key. Further, the security key is preferably dynamically varied (i.e., varied either periodically or at random time intervals).

Further features of the invention, its nature and various advantages, will be more apparent from the accompanying drawing and the following detailed description of the preferred embodiments.

DETAILED DESCRIPTION OF THE PREFERRED EMBODIMENTS

Figure 1:
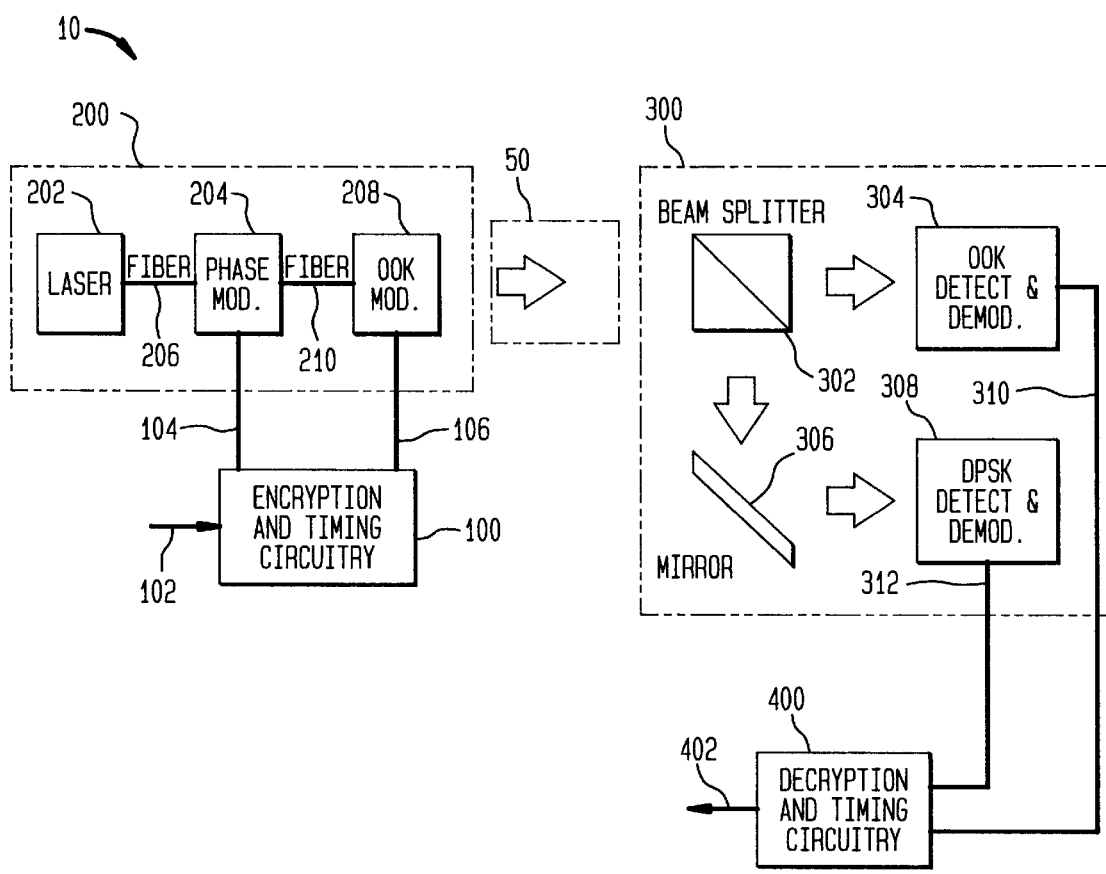
FIG. 1 is a simplified schematic block diagram of an illustrative embodiment of a free-space optical telecommunications link constructed in accordance with the invention.

An illustrative secure free-space optical telecommunications link 10 constructed in accordance with this invention is shown in FIG. 1. In this illustrative optical link, transmission medium 50 is shown as free space. It will be understood that any other transmission medium (e.g., an optical fiber or other waveguide) may be similarly employed.

The secure free-space optical telecommunications link 10 of FIG. 1 comprises encryption and timing circuitry 100 coupled to a transmitter 200, and a receiver 300 coupled to decryption and timing circuitry 400. Encryption and timing circuitry 100 inputs communications information via communications information input bus 102, encrypts the communications information using a security key, and then outputs the security key and encrypted communications information to transmitter 200 via security key output bus 104 and encrypted communications information output bus 106, respectively. Any encryption circuitry known in the art may be employed for encryption and timing circuitry 100.

Transmitter 200 comprises a laser 202 coupled to a differential phase shift keying modulator 204 (hereinafter "DPSK modulator 204") by a first optical fiber 206, and an on/off keying modulator 208 (hereinafter "OOK modulator 208") coupled to DPSK modulator 204 via a second optical fiber 210. While modulator 204 is shown as a DPSK modulator and modulator 208 is shown as an OOK modulator, these modulator selections are merely preferred. For instance, modulator 204 may be an OOK modulator and modulator 208 may be a DPSK modulator. In general, any other modulation schemes may be used for modulators 204 and 208. Furthermore, any variety of modulation devices may be used (e.g., electro-optic amplitude or phase, acousto-optic, traveling wave, and the like).

Each modulator is further operatively coupled to encryption and timing circuity 100 (DPSK modulator 204 being coupled to encryption and timing circuitry 100 via security key output bus 104 and OOK modulator 208 being coupled to encryption and timing circuitry 100 via encrypted communications information output bus 106) which provides each modulator with a modulation signal (allowing the optical beam emitted by laser 202 to be dual-modulated). That is, light emitted from laser 202 travels along first optical fiber 206 to DPSK modulator 204 where it is modulated by the security key output by encryption and timing circuitry 100. Once modulated by DPSK modulator 204, the light then travels along second optical fiber 210 to OOK modulator 208 where it is modulated by the encrypted communications information output by encryption and timing circuitry 100. The dual-modulated light is then transmitted across transmission medium 50 to receiver 300.

Receiver 300 comprises a beam splitter 302 (which receives the light traveling across transmission medium 50 and splits it into a first and a second optical beam), an OOK demodulator 304 which receives the first optical beam, and a mirror 306 which reflects the second optical beam to a DPSK demodulator 308.

Upon receipt of the first optical beam, OOK demodulator 304 demodulates the first optical beam to obtain the information contained therein (i.e., the encrypted communications information) and recovers the data rate of the encrypted communications information with a timing recovery circuit (not shown). The encrypted communications information and its associated data rate are then output to decryption and timing circuitry 400 via encrypted communications information/timing bus 310. Similarly, upon receipt of the second optical beam, DPSK demodulator 308 demodulates the second optical beam to obtain the security key information contained therein and also recovers the data rate of the security key. The security key and data rate information are then output to decryption and timing circuitry 400 via security key/timing bus 312.

After receiving the encrypted communications information, the security key, and the data rates associated with each, decryption and timing circuitry 400 performs all necessary timing/synchronization and decryption processes (described below) to retrieve the original (unencrypted) communications information from the encrypted communications information. The unencrypted communications information is then output from decryption and timing circuitry 400 over a communications information output bus 402.

The details of decryption and timing circuitry 400 are dictated by many factors including the length of the security key used during encryption, the data rates at which the security key and the encrypted communications information are transmitted to receiver 300, the modulation schemes used for modulating the light emitted by laser 202 with security key and encrypted communications information, and the like. If, for instance, on/off keying is used by modulator 208 (for modulating the laser light with the encrypted communications information), the security key must be transmitted at a data rate no greater than one-half of the data rate at which the encrypted communications information is sent so as to prevent an off state of the encrypted communications information from "blanking out" security key data bits. That is, if an OOK modulator is employed, an off state (i.e., no light) may completely mask any security key information if the security key has the same data rate as the encrypted communications information. The security key must therefore be transmitted at a lower data rate than the encrypted communications information so that an off state will only blank out a small portion of a security key data bit, allowing the security key data bit to still be recovered. To compensate for the lower data rate, decryption and timing circuitry 400 must delay the decryption process until the security key is received (as encrypted communications information arrives at a faster rate than its associated security key).

The overall operation of secure free-space optical telecommunications link 10 will now be described. Unencrypted communications information is supplied to encryption and timing circuitry 100 (via communications information input bus 102) where it is encrypted with a security key. Encryption and timing circuitry 100 then outputs both the security key (via security key output bus 104) and the encrypted communications information (via encrypted communications information output bus 106) at predetermined data rates. In a preferred embodiment, the security key is output at a lower data rate than the encrypted communications information so that OOK modulation may be used. In transmitter 200, a laser 202 provides an optical beam to DPSK modulator 204 (via first optical fiber 206) which modulates the optical beam with the security key provided by encryption and timing circuitry 100. This modulated optical beam is then fed to OOK modulator 208 (by second optical fiber 210) which modulates the optical beam with the encrypted communications information from encryption and timing circuitry 100. In this manner, transmitter 200 dual-modulates the optical beam from laser 202 with security key and encrypted communications information. This dual-modulated optical beam is then transmitted through transmission medium 50 to receiver 300.

Upon reception of the dual-modulated optical beam by receiver 300, a beam splitter 302 splits the dual-modulated optical beam into a first and a second optical beam. The first optical beam travels to OOK demodulator 304 and the second optical beam reflects off of mirror 306 and travels to DPSK demodulator 308. OOK demodulator 304 demodulates the first optical beam to obtain the encrypted communications information, determines the encrypted communications information's data rate, and transmits both pieces of information to decryption and timing circuitry 400 over encrypted communications information/timing bus 310. DPSK demodulator 308, on the other hand, demodulates the second optical beam to obtain the security key, determines the security key's data rate, and transmits both pieces of information to decryption and timing circuitry 400 over security key/timing bus 312. With the information from OOK demodulator 304 and DPSK demodulator 308, decryption and timing circuitry 400 decrypts the encrypted communications information to obtain the original unencrypted communications information supplied to encryption and timing circuitry 100. The unencrypted communications information produced by decryption and timing circuitry 400 is then output to communications information output bus 402.

It will be understood that the foregoing is only illustrative of the principles of the invention, and that various modifications can be made by those skilled in the art without departing from the scope and spirit of the invention. For example, any type of encryption scheme may be employed to secure the communications information sent over optical communications link 10. As well, many modulation schemes (OOK, high/low OOK, DPSK, amplitude, polarization, and the like) may be utilized, as may any variety of modulators (electro-optic, acousto-optic, traveling wave, etc.). Furthermore, while the present invention was described in terms of secure free-space optical telecommunications links, any optical communications link may employ these techniques.

The invention claimed is:

1. A method for producing a secure optical beam comprising:
   encrypting communications information with a security key to produce encrypted communications information;
   providing a first optical beam; and
   producing said secure optical beam by modulating said first optical beam with said security key using a first modulation scheme and with said encrypted communications information using a second modulation scheme.

2. The method defined in claim 1 wherein said providing comprises:
   providing a coherent first optical beam.

3. The method defined in claim 1 further comprising:
   dynamically varying said security key.

4. The method defined in claim 1 wherein said producing comprises:
   modulating said first optical beam with said security key using differential phase shift keying.

5. The method defined in claim 1 wherein said producing comprises:
   modulating said first optical beam with said encrypted communications information using on/off keying.

6. The method defined in claim 1 further comprising:
   furnishing said encrypted communications information with a higher data rate than said security key.

7. A method of securing an optical communications link comprising:
   encrypting communications information with a security key to produce encrypted communications information;
   providing an optical beam;
   modulating said optical beam with said security key using a first modulation scheme and with said encrypted communications information using a second modulation scheme;
   transmitting said optical beam;
   receiving said optical beam;
   demodulating said optical beam to recover said security key and said encrypted communications information; and
   using said security key to decrypt said encrypted communications information to obtain said communications information.

8. The method defined in claim 7 wherein said providing comprises:
   providing a coherent optical beam.

9. The method defined in claim 7 further comprising:
   dynamically varying said security key.

10. The method defined in claim 7 wherein said modulating comprises:
    modulating said optical beam with said security key using differential phase shift keying.

11. The method defined in claim 7 wherein said modulating comprises:
    modulating said optical beam with said encrypted communications information using on/off keying.

12. The method defined in claim 7 further comprising:
    furnishing said encrypted communications information with a higher data rate than said security key.

13. The method defined in claim 7 wherein said transmitting comprises:
    transmitting said optical beam through free space.

14. The method defined in claim 7 wherein said receiving comprises:
    receiving said optical beam;
    splitting said optical beam into a first optical beam and a second optical beam;
    feeding said first optical beam to a first demodulator to obtain said encrypted communications information; and
    feeding said second optical beam to a second demodulator to obtain said security key.

15. The method of receiving an optical beam modulated with encrypted communications information and a security key comprising:
    receiving said optical beam;
    splitting said optical beam into a first optical beam and a second optical beam;
    feeding said first optical beam to a first demodulator to obtain said encrypted communications information; and
    feeding said second optical beam to a second demodulator to obtain said security key.

16. The method of claim 15 further comprising:
    demodulating said first optical beam to obtain said encrypted communications information;
    demodulating said second optical beam to obtain said security key; and
    using said security key to decrypt said encrypted communications information to obtain unecrypted communications information.

17. An apparatus for producing a secure optical beam comprising:

an encryption circuit for encrypting communications information with a security key to produce encrypted communications information;

a light source for producing a first optical beam; and a first modulator for modulating said first optical beam with said security key and a second modulator for modulating said first optical beam with said encrypted communications information wherein modulating said first optical beam with both said security key and said encrypted communications information produces said secure optical beam.

18. The apparatus defined in claim 17 wherein said light source is a coherent light source.

19. The apparatus defined in claim 17 wherein said security key is a dynamically varying security key.

20. The apparatus defined in claim 17 wherein said first modulator and said second modulator use different modulation schemes.

21. The apparatus defined in claim 20 wherein said first modulator is a differential phase shift keying modulator.

22. The apparatus defined in claim 20 wherein said second modulator is an on/off keying modulator.

23. The apparatus defined in claim 17 wherein said encrypted communications information has a higher data rate than said security key.

24. An apparatus for securing an optical communications link comprising:

an encryption circuit for encrypting communications information with a security key to produce encrypted communications information;

a light source for producing an optical beam;

a first modulator for modulating said optical beam with said security key and a second modulator for modulating said optical beam with said encrypted communications information;

a transmitter for transmitting said optical beam;

a receiver for receiving said optical beam;

a demodulator for recovering said security key and said encrypted communications information from said optical beam; and a decryption circuit for decrypting said encrypted communications information to obtain said communications information.

25. The apparatus defined in claim 24 wherein said light source is a coherent light source.

26. The apparatus defined in claim 24 wherein said security key is a dynamically varying security key.

27. The apparatus defined in claim 24 wherein said first modulator and said second modulator use different modulation schemes.

28. The apparatus defined in claim 27 wherein said first modulator is a differential phase shift keying modulator.

29. The apparatus defined in claim 27 wherein said second modulator is an on/off keying modulator.

30. The apparatus defined in claim 24 wherein said encrypted communications information has a higher data rate than said security key.

31. The apparatus defined in claim 24 wherein said optical beam is transmitted through free space.

32. The apparatus defined in claim 24 wherein said demodulator comprises:

a first demodulator for demodulating said encrypted communications information; and a second demodulator for demodulating said security key.

33. The apparatus defined in claim 32 wherein said receiver comprises:

a beam splitter for splitting said optical beam into a first optical beam and a second optical beam, said first optical beam being input to said first demodulator and said second optical beam being input to said second demodulator.

34. The apparatus defined in claim 24 wherein said demodulator further comprises:

timing recovery circuitry for recovering a first data rate of said encrypted communications information and a second data rate of said security key.

35. The apparatus defined in claim 34 wherein said decryption circuit further comprises:

timing circuitry for allowing said encrypted communications information to be decrypted when said first and second data rates are different.

36. An apparatus for receiving an optical beam modulated with encrypted communications information and a security key, said apparatus comprising:

a beam splitter for splitting said optical beam into a first optical beam and a second optical beam, said first optical beam being input to a first demodulator to obtain said encrypted communications information and said second optical beam being input to a second demodulator to obtain said security key.

37. The apparatus defined in claim 36 further comprising:

a decryption circuit for decrypting said encrypted communications information to obtain unencrypted communications information.

38. The apparatus defined in claim 36 further comprising:

timing recovery circuitry for recovering a first data rate of said encrypted communications information and a second data rate of said security key.

39. The apparatus defined in claim 38 further comprising:

timing circuitry for allowing said encrypted communications information to be decrypted when said first and second data rates are different.

* * * * *